Dec. 18, 1962  G. P. R. AXT  3,068,684
DEVICE FOR SUPERVISING THE OXYGEN CONTENT IN WATER
Filed May 16, 1960

INVENTOR.
GÜNTER P.R. AXT
BY
ATTORNEYS 3,068,684
DEVICE FOR SUPERVISING THE OXYGEN
CONTENT IN WATER
Gunter Paul Rudolf Axt, Hamburg-Blankenese, Germany, assignor to Chlorator G.m.b.H., Grotzingen-Karlsruhe, Germany, a company of Germany
Filed May 16, 1960, Ser. No. 29,391
Claims priority, application Germany May 16, 1959
4 Claims. (Cl. 73—19)

The present invention relates to devices for supervising the oxygen content in water, and more particularly to devices for continually measuring and indicating the oxygen content.

Such oxygen content indicators are required, for instance, in drinking water plants, to supervise waste water discharges, to control the air feed in installations for the removal of iron, etc.; they are also used in plants utilizing sea or river water in which the biological self-purifying capacity is evaluated in accordance with the oxygen content in the water.

There are known devices of the general kind above referred to, which are satisfactory for the supervision of boiler feed water. These devices measure the depolarisation current of test electrodes, but such devices are not suitable for measuring the oxygen content of strongly polluted water due to sediments forming on the electrodes which make a continuous operation practically impossible. As far as the inventor herein is aware, there are not now available devices which permit a continuous supervision of the oxygen content of highly polluted water.

Accordingly, it is the broad object of the invention to provide a novel and improved device of the general kind above referred to which permits a continuous, reliable and accurate supervision of the oxygen content of water, even if the water is strongly polluted.

A more specific object of the invention is to provide a novel and improved device in which the oxygen contained in the water is completely extracted therefrom thereby assuring a highly accurate indication of the actual oxygen content.

Another more specific object of the invention is to provide a novel and improved device which is more compact and smaller than devices as heretofore known for a given capacity due to the higher efficiency of the device according to the invention.

Still another object of the invention is to provide a novel and improved device of the general kind above referred to which is self-contained in that all the component parts of the device are accommodated in a common housing.

The aforementioned objects, features and advantages of the invention and other objects, features and advantages which will be pointed out hereinafter, are attained by conducting the water to be supervised along a tortuous path and feeding an extraction gas initially substantially free of oxygen and having a higher specific weight than oxygen in counterflow to the water flow in contact therewith along said path. As a result, the gas becomes gradually enriched with the oxygen extracted from the water and due to the large exchange surface at which the water and the gas are in contact, the exchange of oxygen between the water and the gas is complete for all practical purposes. The oxygen absorbed by the gas is then measured in a measuring and indicating analyzer known and suitable for the purpose.

In the accompanying drawing a preferred embodiment of the invention is shown by way of illustration and not by way of limitation.

Figure 1:
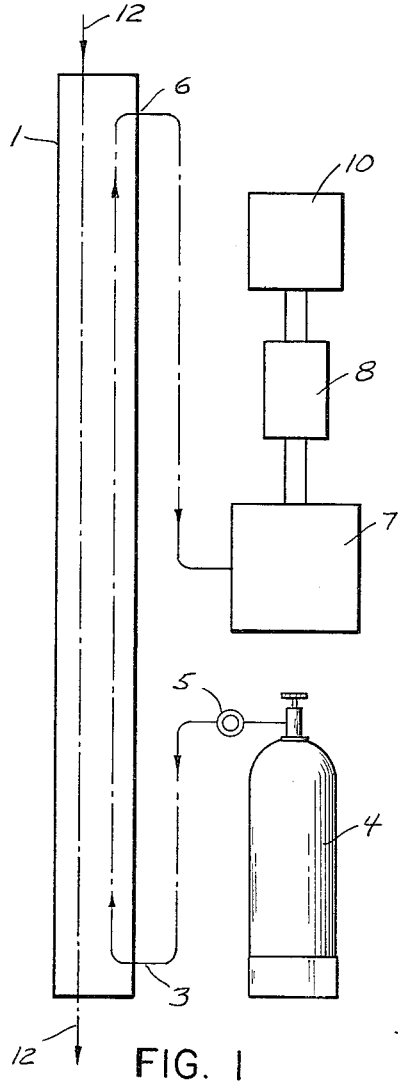
FIG. 1 is a diagram of a device according to the invention.
Figure 2:
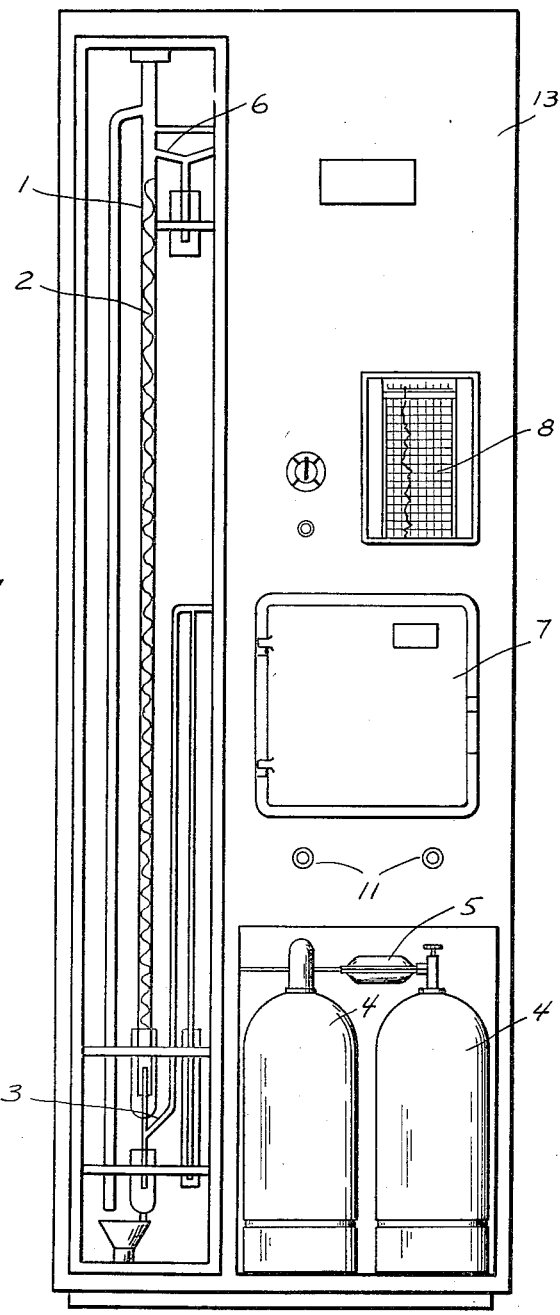
FIG. 2 shows some of the essential structural features of the invention.

Referring now to the figures in detail, the water to be supervised flows through a phase exchanger 1. The water enters the exchanger at the top and leaves the same at the bottom as is indicated by arrows 12. As is shown more in detail in FIG. 2, the exchanger comprises an elongated duct in which are placed along the length thereof flow deflection means 2 to form a tortuous flow path within the duct. The deflection means may be visualized as a spiral-shaped band, or as a multitude of short radial baffle plates. The treatment gas is drawn from a suitable source of supply such as one or several pressure bottles 4. The gas is fed to the phase exchanger through a reduction valve 5 and enters the duct in the exchanger at the bottom thereof. It leaves the exchanger duct at 6 and is then guided to a gas analyzing device 7. The analyzing device includes or is connected to an indicator 8 which records the gas indications on graph paper as shown in FIG. 2. The analyzing instrument may be any suitable conventional type. There are known, for instance, suitable thermomagnetic instruments. Such instruments utilize the paramagnetic properties of oxygen and the attitude thereof in a magnetic field. An electric heating element such as a wire is located in the zone of the highest flux density and acts as a temperature sensitive resistance. The resistance is connected as an arm in Wheatstone bridge which controls the indications of the recording instrument 8. The analyzing instrument is supplied with current from a constant voltage transformer 10. Analyzing instruments as herein referred to are well known in the art and do not constitute part of the invention. Accordingly, a more detailed description of the analyzer is not believed to be necessary for the understanding of the invention. The same is true for the recorder 8 and its control by the analyzer.

According to the invention the treatment gas used is a gas which has a higher specific weight than oxygen. Propane gas has been found to be suitable and also still heavier gases as are known under the name Frigen ($CF_2Cl_2$). Such gases also afford the advantage that they are in gaseous form at room temperature so that it is not necessary to gasify the same at an elevated temperature and by using an auxiliary gas.

Propane and similar gases are substantially free of oxygen. As the gas rises within the duct of the phase exchanger 1 in counter current to the water, it will extract the oxygen from the water, due to the tortuous path along which the water and the gas are in contact with each other. The total area of contact is a comparatively large one in even a rather short phase exchanger. Accordingly, a very thorough extraction of the gas can be obtained in a phase exchanger of small dimensions.

While initially the specific weight of the propane and other gases used according to the invention is considerably higher than that of the oxygen, the specific weight of the gas is gradually reduced due to the absorption of the oxygen. This gradual and automatically occurring decrease of the specific weight of the gas in the flow direction thereof affords the very important advantage that the gas does not have any, or at the most a very insignificant tendency to form eddy currents or to reverse even temporarily its direction of flow. As is evident, any disturbance of a smooth counterflow of the gas would falsify the indications obtained in the analyzer.

Due to the required comparatively short length of the phase exchanger, the same and all other components of the device can be conveniently accommodated in a housing 13 in which are also housed two gas bottles 4. The water feed and the gas feed can be adjusted by regulating devices well known for the purpose and indicated by adjustment knobs 11.

It has been found advisable to feed the water and the gas at constant pressure through orifices of constant and uniform cross section whereby the conduits for feeding the gas are protected against interference by depositions of condensing water. Tests have shown that about 90% of the total oxygen content will be very rapidly transferred from the water into the gas. Such rapid transfer of the majority portion of the oxygen results in a narrow error range.

A suitable oxygen analyzer is, for instance, an analyzer available in the market under the name Magnos 5 manufactured by Hartmann and Braun AG, a German firm. The analyzer just mentioned and other analyzers available in the market register the oxygen content independent of any other gases present. They do not require any servicing and it is merely necessary to prevent clogging by solids or growth of algae. Since most of the components of the entire device are made of glass any tendency to clogging can be readily observed and easily eliminated, for instance, by flushing the duct and other components of the device with hydrochloric acid, chromosulphuric acid and other acids.

The recorder is preferably directly calibrated in units of oxygen.

A 5 kg.-propane gas bottle, as readily available in the market, is generally sufficient for about one month when the flow of gas and water are correctly adjusted. A water flow of 20 liters and a propane gas flow of about 3 liters per hour are customary.

While the invention has been described in detail with respect to a certain now preferred example and embodiment of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A device for supervising the oxygen content of water, comprising a phase exchanger including an upright flow duct, first conduit means for feeding the water to the upper end of said duct and discharging the water from the lower end of the duct, a supply of inert gas having a specific weight higher than oxygen, second conduit means for feeding said gas to the lower end of the duct and discharging the gas from the upper end of the duct whereby oxygen dissolved in the water is transferred to the gas flowing in countercurrent to the water, a spirally wound strip disposed lengthwise within the duct causing the downward flow of water to form a smooth film on the inner wall of the duct, and gas analyzing and indicating means connected to said second conduit means at the gas egress side of the duct for measuring and indicating the oxygen content of the discharged gas.

2. A device according to claim 1, wherein said supply of gas comprises a supply of propane gas.

3. A device according to claim 2 wherein said supply of gas comprises a supply of $CF_2.Cl_2$ gas.

4. A device according to claim 1 and comprising a housing, said duct, said analyzing means and said second conduit means being disposed within said housing, and said supply of gas being contained in a pressure bottle also disposed within said housing.

References Cited in the file of this patent

UNITED STATES PATENTS

| 274,176 | Copeland | Mar. 20, 1883 |
| 2,310,829 | Becker | Feb. 9, 1943 |
| 2,559,129 | Miller | July 3, 1951 |
| 2,671,343 | Jacobs et al. | Mar. 9, 1954 |

FOREIGN PATENTS

| 213,280 | Australia | Feb. 21, 1957 |